Nov. 7, 1961   R. L. KIMBROUGH ET AL   3,007,800
PROCESS OF PREPARING A FROZEN FOOD PRODUCT FROM SWEET POTATOES
Filed Jan. 25, 1960
3 Sheets-Sheet 1
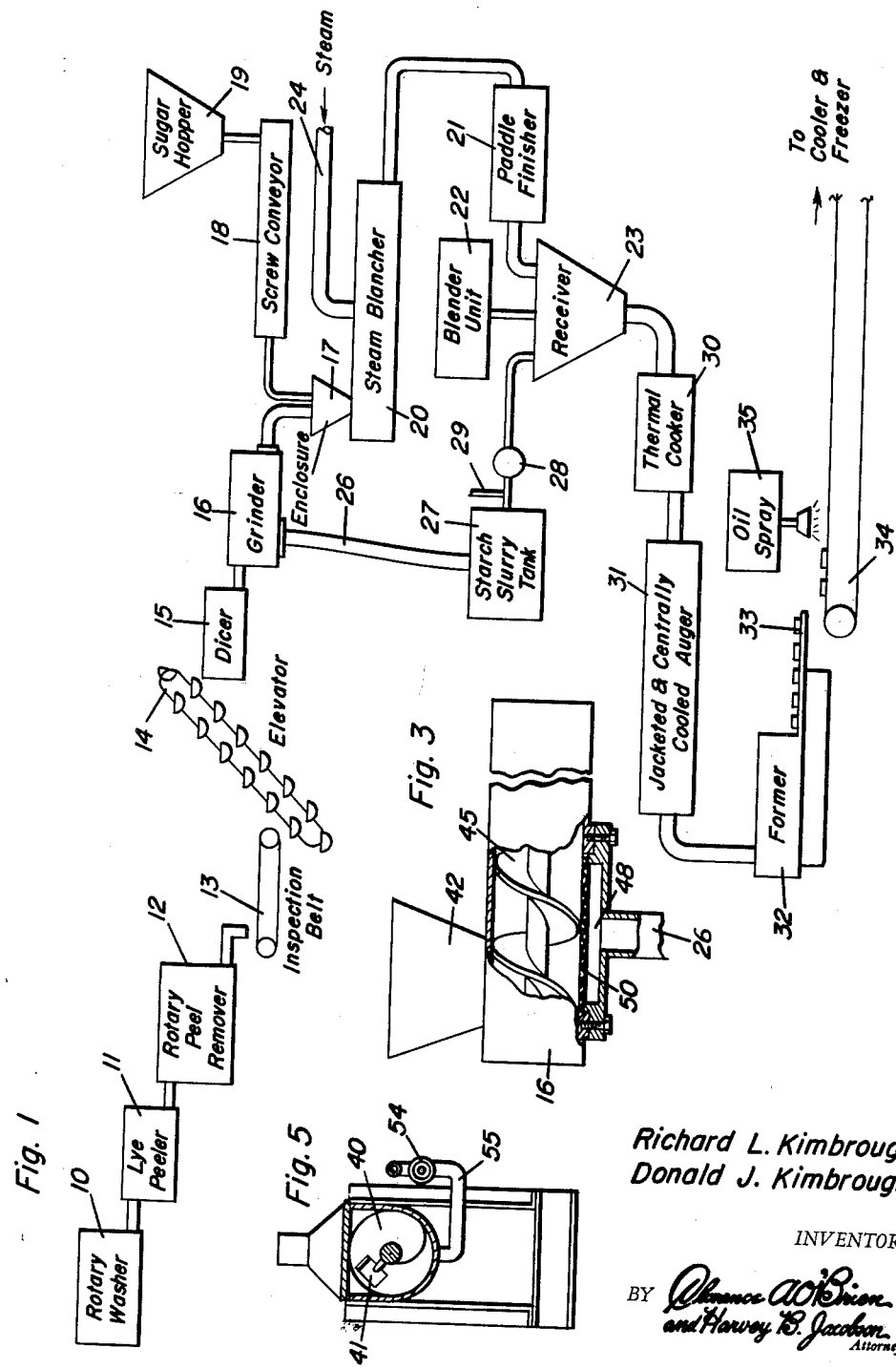
Richard L. Kimbrough
Donald J. Kimbrough
INVENTORS Nov. 7, 1961    R. L. KIMBROUGH ET AL    3,007,800
PROCESS OF PREPARING A FROZEN FOOD PRODUCT FROM SWEET POTATOES
Filed Jan. 25, 1960    3 Sheets-Sheet 2
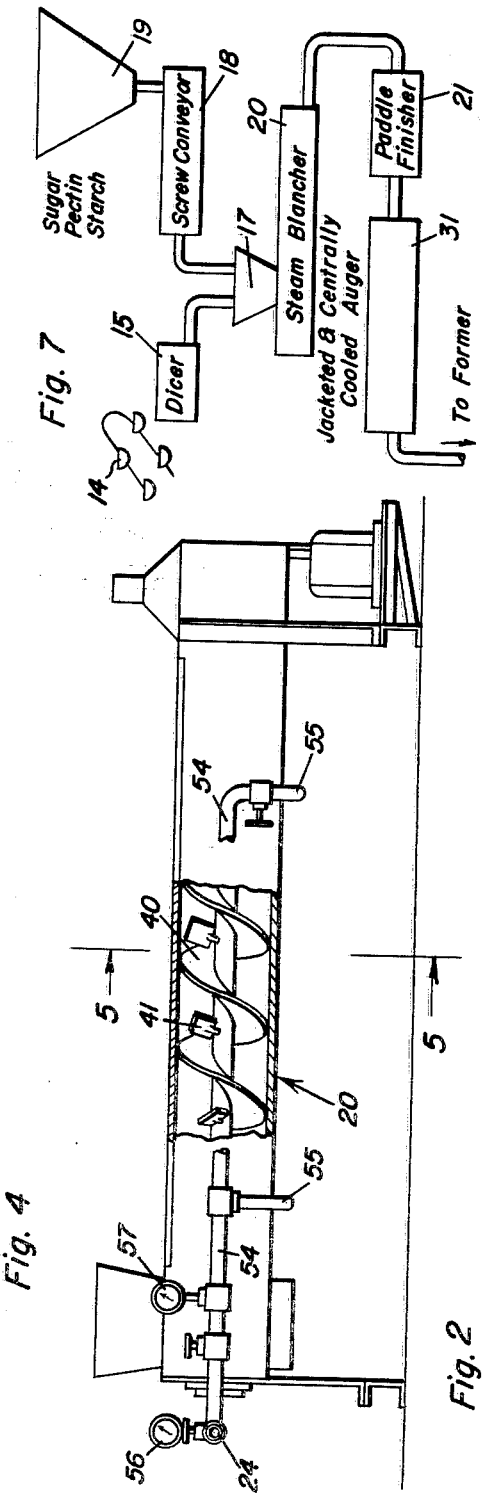
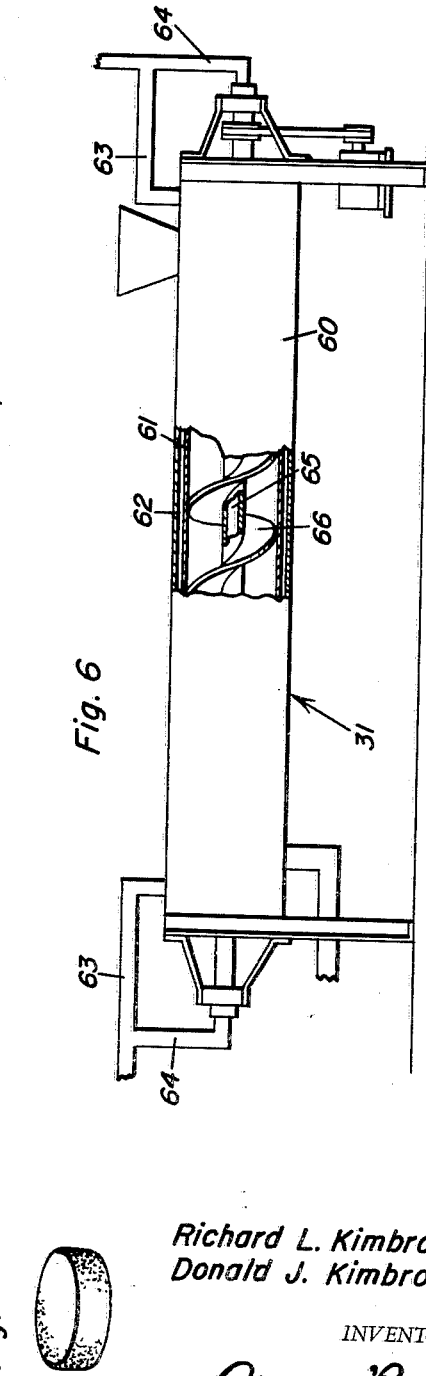
Richard L. Kimbrough
Donald J. Kimbrough
INVENTORS

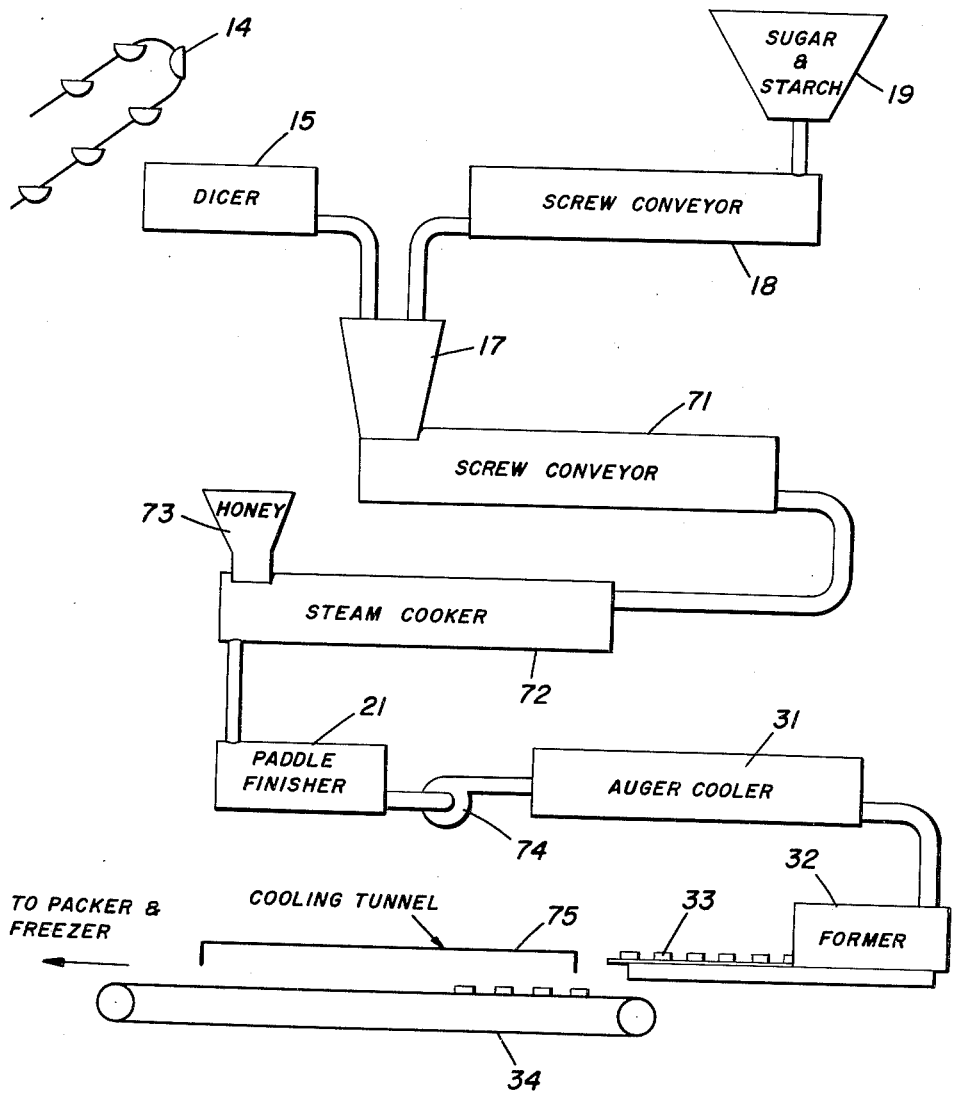

though the sugar used for candying could not stand the heating by the consumer necessary to convert the frozen product into a state of readiness for consumption. Subjecting the candied sweet potatoes to heat entailed a caramelizing of the sugar which made the product unpalatable.

United States Patent Office 3,007,800
Patented Nov. 7, 1961

3,007,800
PROCESS OF PREPARING A FROZEN FOOD PRODUCT FROM SWEET POTATOES
Richard L. Kimbrough and Donald J. Kimbrough, both of P.O. Box 428, Van Buren, Ark.
Filed Jan. 25, 1960, Ser. No. 4,849
12 Claims. (Cl. 99—193)

This invention relates to a method of preparing frozen sweet potatoes. This application is a continuation-in-part application of Serial No. 794,657, filed February 20, 1959, now abandoned.

The principal object of the invention is to teach a method for preparing a frozen food product consisting essentially of sweet potatoes which is of uniform texture and which, when subjected to a short preparatory heating step before consumption, will produce a food which has preserved all the tasty flavor, the nutritious properties, especially the content in vitamins and minerals, and the various other desirable properties of sweet potatoes.

A further main object of the invention consists in preparing a food product from sweet potatoes or yams, as they are sometimes called, which can be prepared from raw material of all sizes and of different textures, while it has itself a uniform texture.

A further object of the invention consists in preparing a food product consisting essentially of sweet potatoes which may be marketed in the frozen state and which will neither present a leathery or a tough surface when ready for consumption nor will dehydrate during the frozen state.

A number of further objects of the invention relate to the steps of the process by means of which the product is made and therefore these objects and the advantages obtained are explained in connection with a more detailed description of the process.

It is well known that sweet potatoes (sometimes called yams) are much more difficult to treat, to handle, to transport and to store than common potatoes, that they are extremely sensitive to injuries and to careless handling and that they differ considerably in flavor, in cooking qualities and in other respects, and therefore lack uniformity to a much higher degree than common potatoes.

Sweet potatoes have been canned during recent years, but no satisfactory frozen sweet potato product has so far appeared. The attempt to produce frozen products has mainly been directed towards freezing a prepared or cooked sweet potato as such, or towards preparing a crisp fried product resembling French fried potatoes. These attempts were not successful for a variety of reasons, among them the fact that in their natural cooked state freezing did not prevent dehydration, and in a fried state the frozen product had a leathery, tough and unpalatable crust. Sweet potatoes are frequently candied and it was also attempted to produce frozen candied sweet potatoes, but this attempt did not succeed because the sugar used for candying could not stand the heating by the consumer necessary to convert the frozen product into a state of readiness for consumption. Subjecting the candied sweet potatoes to heat entailed a caramelizing of the sugar which made the product unpalatable.

The invention consists essentially in a process and a product which results in a frozen sweet potato product essentially free of the many defects introduced by the treatment such as hitherto used, so that neither the preparation nor the freezing process nor the heat treatment of the frozen product in the final stage before consumption will result in damage to the quality or the flavor and to the nutritional value of the raw material.

The process is best described in connection with the accompanying drawings illustrating the process. It is, however, to be understood that what has been illustrated is essentially only illustrative and refers to certain materials; that readjustment of the data is necessary whenever the material used changes, a readjustment which is well within the skill of the expert, and that changes of the details illustrated by way of example do not necessarily in any way indicate a departure from the essence of the invention.

In the drawings:

FIGURE 1 is a flow sheet indicating diagrammatically the process and the apparatus used during this process.

FIGURE 2 is a perspective view of the product.

FIGURE 3 is a fragmentary, diagrammatic, partly sectional view of the front portion of a grinder, used during this process.

FIGURE 4 is a partly sectional, elevational diagrammatic view of the blanching and cooking apparatus used.

FIGURE 5 is a diagrammatic elevational sectional view of the front side of the apparatus shown in FIGURE 4, the section being taken along line 5—5 of FIGURE 4.

FIGURE 6 is an elevational, partly sectional and diagrammatic view of a combined cooling and converting apparatus using an auger, delivering the material to a molding apparatus.

FIGURE 7 is a diagram showing a modification of the process which simplifies the latter considerably. The diagram shows only the modified portion of the flow diagram, the remainder of the process being carried out as illustrated and described in connection with FIGURE 1.

FIGURE 8 is a diagram showing a further modification of the process and which is a preferred embodiment thereof. The diagram shows only the modified portion of the flow diagram, the remainder of the process being carried out as illustrated and described in connection with FIGURE 1.

Essentially the process according to the invention consists in first grinding the sweet potatoes, after they have been washed and peeled, to a fine consistency and in forcing them, without exposing them to the outer air, into a cooker in which they are mixed with sugar and are steam cooked. After cooking, the product is finished in a paddle finisher making a smooth puree, which removes fibers and lumps, then the puree may be blended with a starch slurry which has been partly prepared with the juice extracted from sweet potatoes during the grinding, whereupon in another cooking apparatus the starch is gelatinized. In the modified and preferred embodiment, the starch is added with the sugar and is cooked with the potatoes so that a separate cooker and blender can be dispensed with. The product is then cooled by means of a cooling and conveying apparatus containing an auger and jacket which are cooled, and then the product is squeezed through dies so as to obtain the desired shape. The shape may vary and a cutter is arranged to cut up portions of the desired thickness or length; then the shaped products are moved through a cooling tunnel and subsequently through a freezer. Before, however, entering the cooling tunnel, a step employed in one embodiment consists in spraying the product with vegetable oil which, as will hereinafter be described, not only improves the taste and permits frying by the consumer, but also prevents dehydration and the formation of a tough and leathery crust. The product may take a circular form or it may be extruded in the shape of an oval.

The process is characterized among other features, by the exclusion of air from the diced and/or ground material, by the addition of starch and of monosodium glutamate, and by the gelatinization of the starch. One modification of the process is further characterized by the addition of the juices expressed in the grinder to the starch slurry which is added to the puree after cooking and finishing. The process is further characterized by the cooling stage preceding the forming and by the oil spraying of the shaped product in one embodiment of the invention. The result of the process is a product of remarkable uniformity and stability and of a flavor and taste which preserves fully that of the sweet potatoes. It also eliminates the difficulties which are experienced in connection with the sugar addition. The uniformity of the product has a very decided advantage because it permits a most economic utilization of the sweet potato which is something which was not obtained with any other known process. Usually the mixing of different sweet potatoes is avoided, as normally the mixing of different types of sweet potatoes and especially the utilization of very small potatoes—almost invariably left in the field to rot—must be avoided on account of the difference in flavor and texture, and especially on account of the difference in cooking qualities. These differences have disappeared during the treatment as outlined or are not sufficiently marked to be noticed. The process thus permits economy.

In order to begin the process of the present invention, it is necessary to first clean the sweet potatoes by washing in a rotary washer 10; then the sweet potatoes are peeled using conventional methods, for instance, by using a so-called lye peeler 11 in which the sweet potatoes are conveyed through a hot solution of caustic soda.

FIGURE 1 illustrates the various stages of the process showing one embodiment thereof. It will be seen that after passing the rotary washer 10 and the lye peeler 11, the sweet potatoes are again passed through a rotary washer 12 in which the peel and the lye solution are washed off. Then the sweet potatoes are dropped onto an inspection belt 13 permitting the removal of those potatoes which are defective. Defects, such as growth cracks and misshapes, usually leading to the elimination of potatoes, do not matter in this case. In connection with the process according to the invention, only potatoes showing decay, such as soft wet rot or dry decayed areas, must be removed as they impart a disagreeable flavor to the whole potato, not only to the affected area. This preliminary treatment is, however, conventional. The sweet potatoes are delivered by the inspection belt to a bucket elevator 14 which delivers them to a dicer 15.

The dicer 15 is of a conventional construction and its purpose is solely to break up the raw sweet potatoes into small pieces, so that they may be treated in a grinder which can only be fed with pieces much smaller than the potatoes. The grinder 16 is also of the conventional type, but has several features added in order to adapt it to the process. The grinding means are conventional and include a rotary feed screw 45 and cutter, but, as seen in FIGURE 3, near the feeding end of the grinder where the hopper 42 receives the diced potatoes, a slot is milled into the bottom portion of the wall surrounding the feed screw. Into this slot a screen 50 is fitted which covers the slot completely. The screen is so fitted into the slot that there is just sufficient room for clearing the feed screw. The raw sweet potatoes usually carry a considerable amount of juice, although the amount of juice varies greatly with the raw material used. To control the consistency of the product, it is, however, necessary to remove the excess juice and this is done by means of the screen 50 which allows the excess juice to run off. The raw material, however, is held back by the screen. The juice, as will be described below, is utilized by feeding it to materials which are afterwards again supplied to the process at another stage, this forming one characteristic feature of the invention.

From the grinder, the ground sweet potatoes are delivered into a conical receiving hopper 17. It is a feature of the process according to the invention that the delivery of the ground sweet potatoes to the conical receiver, leading to the cooker to be described below, is carried out in such a way that the comminuted ground potatoes do not come into contact with the outer air. They are delivered into the conical receiving hopper 17 by means of a pipe leading into and through the conical receiver and are delivered into the steam blancher and cooker 20 without being exposed. This has been found to be of primary importance for the quality of the product. The finely ground material is greatly affected when exposed to air and immediately darkens almost completely and greatly deteriorates. Thus, it is imperative that the ground material should be protected from air until it reaches the steam blanching device or cooker indicated at 20 in the flow diagram.

The cooker and steam blancher is a type which is conventional and which is currently used in live steam blanching, but it is provided with some additional features. The steam blancher and cooker is of a type such as used for the blanching of mushrooms, fruits and vegetables.

The product to be blanched is conveyed through the blanching chamber, usually made of stainless steel, in a uniform and continuous motion, and is gently turned over and over by special lifting devices.

Steam flow provided in the apparatus secures the uniformity of quality and color of the product. Graduated steam inlets through a special steel jacket show the correct amount of steam to be delivered at the proper place. The blancher and cooker is equipped with a positive variable drive permitting a certain speed range that will insure uniform blanching of all products regardless of size and shape and shrinkage. The movement of the material along the steam blancher and cooker is produced by a feed screw or auger of a special type which replaces the auger which is usually used in this type of apparatus.

Together with the finely ground sweet potatoes, sugar is supplied to the conical receiving hopper 17 of the cooker 20, the sugar being metered from a hopper 19 by means of a screw conveyor 18 which acts as the metering device, exactly limiting the quantity of sugar which is supplied from the hopper 17 to the steam blancher and cooker 20.

This sugar addition is intimately mixed with the ground sweet potato material within the steam blancher and cooker 20 by means of the special feeding screw or auger above mentioned. This auger is illustrated in FIGURE 4. It comprises not only the usual helical feeding surfaces having a certain pitch moving the material forward when the auger is rotated, but in addition blades 41 are provided which are set with a pitch of approximately the same magnitude, but operating in opposite direction. The blades preferably have an adjustable pitch and may be set as desired. The blades 41 have a much smaller surface than the feeding screw 40. The action of the blades produces a very intimate mixing of the sugar and of the ground sweet potato material.

During the forward and mixing movement to which the mixture of ground sweet potato material and sugar is subjected, the mixture is treated with steam which is admitted through pipe 24 and is distributed along the entire apparatus in order to obtain uniform heating by means of the pipes 54 and 55 as illustrated in FIGURES 4 and 5. The steam supply in the construction and operation of the cooker is such that the sugar and sweet potato material are heated in the steam blancher and cooker to a temperature of between about 200° to 210° F.; the material remains within the cooker for a period of about 10 minutes. With the sweet potato material which was selected as an example, approximately 17 pounds of sugar are supplied for each 100 pounds of ground material supplied to the cooker.

However, the amount of sugar varies somewhat with the type of sweet potatoes, which type is again variable with the place of origin of the sweet potatoes. Pressure gauges 56 and thermometers 57 or thermostats assist in maintaining the desired temperature which is most suitable for the type of sweet potatoes to be treated.

The mixure delivered by the steam blancher and cooker 20 after treatment is fed by means of a suitable pipe to a paddle finisher 21 which is an apparatus which is of standard construction used generally in producing tomato puree, catsup, apple butter, pumpkin and squash puree, etc. Essentially the construction of this known apparatus is not changed.

The apparatus includes paddles which are made of metal ribbed for strength which are adjustable both for lead and clearance, the lead being adjustable in order to govern the rate at which the material is moved from the intake end to the point of discharge and the clearance is adjustable in order to govern the degree of rubbing to which the material is subjected during its progress to the screen section. The screen is perforated around its entire circumference so that all of it is utilized. The screen frame is of the hooked type and is fitted with four adjustable frame locks. Usually the screen is divided and is not riveted to the frame, but is clamped in place and the two halves, for instance are locked together so that it is readily removable for changing to another perforation or for cleaning. This standard construction of a paddle finisher essentially produces a smooth puree of uniform consistency from which fibers and lumps have been removed by the screen through which the product is passed.

From the paddle finisher 21, the material goes to a cone-shaped receiver 23 in which a starch slurry is blended with the puree coming from the paddle finisher. The starch slurry is prepared or contained in a container 27 and the supply of starch to the conical receiver 23 is metered by means of a valve indicated at 28. During the delivery, an agitator or blender unit 22 is constantly operated so that the starch delivered from the container 27 and the mixture of sugar and sweet potatoes coming from the paddle finisher are constantly intimately mixed and blended during the delivery into the receiver 23.

In order to prepare the starch slurry, the juice which has been expressed from the sweet potatoes in the grinder may be used and a pipe 26 is therefore provided for conducting the juice expressed in the grinder compartment and which has passed through the screen 50 and has been collected in the space 48 below the screen, to the starch container 27.

At or near the delivery end of the starch container 27, there are means for delivering monosodium glutamate which may be added by means of a pipe indicated diagrammatically in the flow sheet at 29. As an example, 4.75 lbs. of starch and 2 oz. of monosodium glutamate are added for each 100 lbs. of raw sweet potatoes which are fed into the cooker.

From the reeciver 23, the material now flows into a thermal cooker 30 which is a commercial standard unit particularly designed for gelatinizing starch. The apparatus, while designed for the gelatinizing of starch slurry for paper and textile mills, may however, be used without any change and it is also used in continuous operation practically for the same purpose. The unit injects live steam into the product as it is pumped through it.

Essentially the apparatus comprises a steam cooking chamber usually made of stainless steel and a pump usually made of nickel alloy, and the slurry is circulated and recirculated through the apparatus as necessary. It may also be circulated in small batches. The cooking chamber is also steam heated.

From this unit the mixture enters the combined feeder and cooler 31 which is specially illustrated in FIGURE 6. It comprises a cylindrical jacketed container 60 which is provided with an inner mantle 61, a cooling jacket being formed between the outer mantle 62 and the inner mantle 61. Cooling fluid, for instance, water, is admitted to the jacket through pipe 63. Further, a feeding screw fills the interior of the cylindrical container; said feeding screw or auger 66 is mounted on a hollow shaft 65 through which a cooling fluid is circulated by means of pipes 64.

The product while moving through the apparatus is thus slowly cooled practically uniformly by the feed screw or auger 66 which is constantly cooled by the coolant running through the hollow shaft, and by the mantle surrounded by the cooling jacket. The temperature of the mixture is thus slowly reduced from the temperature of cooker 30 to a temperature not less than 125° F. and preferably to at least 140° F. The mixture now enters the forming machine 32 which may be of any desired type but preferably is simply a former in which the puree is forced through a die of the desired shape and size and which is provided with a cutter which cuts off extruded pieces of the desired length. In the example stated, round patties such as shown in FIGURE 2, of a relatively small thickness are made, but the shape may vary considerably and may therefore include oval shaped patties.

The apparatus used for this purpose is conventional and is commercially obtainable. It may be one of those apparatuses which are widely used in order to produce bonbons, fondants, cream centers, and other candy material. It consists of a die plate with a number of discs arranged side by side, above which feed rolls are disposed which carry the material through the dies without compressing the material to an extent which might damage it. The die determines the size and shape, and the adjustment of the speed of the feed rolls determines the height or thickness of the extruded material. The adjustment of the feed rolls is done by means of a belt which is adjustable. A variable speed device determines the number of strokes per minute of the cut off device which usually consists only of a wire and this permits the synchronizing of the speed of deposition with the speed of the conveyor or other apparatus on which the formed material is deposited.

The patties which come out of the former and are indicated at 33 are deposited on a conveyor belt 34 and travel on this conveyor belt towards the cooling tunnel wherein the patties are cooled to approximately 100° F. In one embodiment they are sprayed while traveling with vegetable oil by means of the spraying device 35 which covers the patty with vegetable oil. The conveyor 34 carries the patties through a cooling tunnel to the freezer in which they are frozen and, after being frozen are delivered to the packaging room where they are packaged.

The oil spraying of the patties performs a plurality of functions. The product which is obtained after spraying the patties with vegetable oil is not only uniformly palatable, but is to a high degree tasty, and no off flavors are found either with the entire production or with a percentage thereof. This is ascribed to the fact that when the various cut portions are frozen they expand and the oil now penetrates the surface. When the product is afterwards heated during the preparation for consumption, it is defrosted and shrinks. This causes the vegetable oil to be distributed over the entire outside surface, preventing the heat from causing a tough and leathery skin.

The flow sheet for a simplified process which also produces excellent results, is diagrammatically illustrated in FIGURE 7 which shows only those stages of the process in which a change was made, the other stages of the process being identical with those already described and illustrated in the flow sheet in FIGURE 1.

The sweet potatoes are treated in the first stages as already described with reference to FIGURE 1 until the dicer is reached. According to the simplified process, the grinder is dispensed with and the contents of the dicer may be directly fed into the receiving hopper 17 of the steam blancher 20. They are to be protected against exposure to air in the manner already described. Further, the starch together with some fruit pectin is carefully mixed with the sugar and the blend of sugar, starch and pectin to which monosodium glutamate may be added is fed through the hopper 19 and is metered on its way to the steam blancher 20 by the screw conveyor 18. The conveyor 18 delivers the blend of sugar, starch and pectin into the receiving hopper 17 of the steam blancher. As an example, for 100 lbs. of sweet potatoes, 15 lbs. of sugar, 3.8 lbs. of starch, 6.2 oz. of pectin and 2 oz. of monosodium glutamate may be used.

The addition of pectin permits the reduction of the amount of starch used to improve the process by producing a quick set or jellying at a temperature which is higher than that otherwise required.

In the steam blancher not only the sweet potatoes mixed with sugar are treated in the manner above described with reference to FIGURE 1, but also the starch is cooked so that a special thermal cooker for this purpose may be eliminated.

After treatment in the steam blancher which is identical with the treatment already described, the mixture is delivered to the paddle finisher 21 which is identical with the one described above.

As the starch has already been supplied and has been cooked in the steam blancher, the paddle finisher can discharge its product which is a puree into the combined feeder and cooler 31 identical with the apparatus having the same reference numeral already described. From thereon, the process again is completely identical with the process which has been described with reference to FIGURE 1.

The flow sheet for the preferred embodiment of the present invention is illustrated diagrammatically in FIGURE 8 which shows only those stages of the process in which a change was made, the other preliminary stages of the process being identical with those already described and illustrated in the flow sheet in FIGURE 1.

As in connection with the process shown in FIGURE 7, the contents of the dicer 15 are fed directly into the receiving hopper 17. The starch-sugar mixture together with some citric acid, monosodium glutamate and salt are added to the receiving hopper 17. The mixture from the hopper is conveyed and carefully blended in screw conveyor 71 to steam cooker 72. The cooker 72 heats the product to a temperature of 210° F. by means of steam injection and a steam jacket. The degree of steam injection undertaken depends upon the moisture content of the potato. At the end of the cooking cycle honey may be metered into the product from a hopper 73 in a quantity sufficient to impart the desired flavor characteristics.

The product is then fed to a conventional paddle finisher 21 where a puree is produced. Pump 74 carefully meters the mixture into auger cooler 31, also employed in the above described processes. The cooling process is adjusted so that the throughput time for the sweet potatoes is only about two minutes and the product is not cooled to less than 125° F. but to at least 140° F. The auger is not permitted to rotate at more than 100 r.p.m. The product is now in an ideal condition for forming purposes and is fed to former 32 where patties 33 are produced and positioned on sheets of wax paper and then placed on conveyor belt 34 which moves the patties into a cooling tunnel 75. The patties are cooled to a temperature of about 100° F. by means of cold filtered air. The cooled patties on the sheet of wax paper are then placed in suitable boxes and frozen. It will be appreciated that the patties are no longer tacky after being cooled in the tunnel so that they may be easily handled for insertion into the boxes.

The preferred amount of additive to be added to the sweet potatoes is approximately 14 lbs. of the blend to 100 lbs. of diced raw potatoes. A preferred blend comprises: 400 lbs. sugar, 75 lbs. starch, 2.5 lbs. citric acid, 5 lbs. monosodium glutamate and 10 lbs. salt. It has been discovered that new potatoes require less starch and more sugar than cured potatoes which require greater quantities of starch and less sugar. The product of the preferred embodiment may be employed in any of the usual cooking ways commonly employed with sweet potatoes.

Thus, it is seen that the invention introduces a new process of preparing sweet potatoes which eliminates most of the defects of the known processes and results in a product which is of a higher quality than could be produced with the known methods for freezing sweet potatoes.

It will be clear, as has been explained, that changes may be made in the various details of the process without in any way departing from the essence of the invention as defined in the annexed claims.

What is claimed as new is as follows:

1. The process of making a frozen sweet potato product which comprises: comminuting raw sweet potatoes; adding a mixture of sugar and starch to the comminuted raw sweet potatoes, the latter being supplied under exclusion of exposure to the open air; simultaneously intimately mixing and cooking the comminuted raw sweet potatoes with the mixture of sugar and starch, said cooking being at a temperature between about 200° F. and 210° F. and for a time sufficient to gelatinize said starch; pureeing and removing lumps and fibers from the cooked material; cooling the mixture slowly to a temperature between about 125° F. and 140° F. in a first cooling step, extruding the mixture; cutting the extruded mixture into portions of predetermined size; cooling the portions to approximately 100° F. in a second cooling step and then freezing the portions.

2. The process of preparing a frozen sweet potato product as claimed in claim 1 wherein citric acid is added to the mixture of sugar and starch.

3. The process of preparing a frozen sweet potato product as claimed in claim 1 wherein pectin is added to the mixture of sugar and starch.

4. The process of preparing a frozen sweet potato product as claimed in claim 1 wherein the sweet potatoes are brought to a cooking temperature of approximately 210° F. and maintained at this temperature for approximately ten minutes.

5. The process of preparing a frozen sweet potato product as claimed in claim 4 wherein the cooked sweet potatoes are slowly cooled during the first cooling step to a temperature of not less than 125° F. and to at least 140° F.

6. The process of preparing a frozen sweet potato product as claimed in claim 5 wherein the formed portions of sweet potatoes are cooled to approximately 100° F. during the second cooling step.

7. The process of claim 1 including in addition the step of spraying the cut portions with a vegetable oil before the second cooling step.

8. The process of claim 1 wherein there are about 11.4 pounds of sugar and about 2.1 pounds of starch for each 100 pounds of raw potatoes.

9. The process of making a frozen sweet potato product which comprises comminuting raw sweet potatoes adding sugar to the comminuted raw sweet potato; simultaneously intimately mixing and cooking the comminuted raw potatoes and the sugar which has been added; protecting the comminuted raw sweet potatoes from contact or exposure to the open air before mixing and cooking them together with sugar; pureeing the cooked material cooling the puree slowly to a temperature between about 125° F. and 140° F.; adding starch and cooking the same at a temperature between about 200° F. and 210° F. between the steps of comminution of the raw sweet potatoes and the cooling of the puree; shaping the mixture after cooling while extruding and cutting it, forming portions of predetermined size; spraying the portions with vegetable oil and in cooling the portions to 100° F. and then freezing the portions.

10. The process of claim 9 wherein there are about 17 pounds of sugar and about 4.75 pounds of starch in the mixture for each 100 pounds of raw potatoes processed.

11. The process of making a frozen sweet potato product which comprises cleaning, washing and peeling raw sweet potatoes; dicing and grinding the peeled sweet potatoes; expressing the juice during the grinding of the sweet potatoes and in removing some of the juice; adding sugar to the ground raw sweet potatoes; delivering the ground raw sweet potatoes to the place where the sugar is added under exclusion of exposure of the ground raw sweet potatoes to the open air; pureeing the cooked material; preparing a starch slurry; adding to the starch slurry the removed juice expressed from the sweet potatoes during the grinding; mixing and blending the puree and the starch slurry containing said expressed juice; gelatinizing the starch by cooking the mixture at a temperature between about 200° F. and 210° F.; conveying the mixture towards a position in which the mixture is formed into portions; cooling the mixture to a temperature between about 125° F. and 140° F. while conveying it towards the same position; bringing it during such conveying into intimate contact with cooled surfaces; forming the mixture into portions; spraying the portions with vegetable oil and cooling to approximately 100° F. and then freezing the portions.

12. A frozen sweet potato product comprising the product of the process of claim 11.

References Cited in the file of this patent

UNITED STATES PATENTS

| | | |
|---|---|---|
| 2,401,392 | Ware et al. | June 4, 1946 |
| 2,860,994 | Oathout | Nov. 18, 1958 |
| 2,861,889 | Carman | Nov. 25, 1958 |
| 2,912,330 | Hawk et al. | Nov. 10, 1959 |

OTHER REFERENCES

"Food Industries," August 1944, pages 84, 85, and 86, article entitled Freezing Provides an Answer to Sweet Potato Problem, by J. G. Woodroff et al.

"Food Engineering," October 1954, pages 65, 66, 67, 68, 238, and 239, article entitled Canning Sweet Potatoes, by J. G. Woodroff et al.